July 10, 1928.
J. M. MORRILL
BREAD PROOFER
Filed June 22, 1926     2 Sheets-Sheet 2
1,677,043
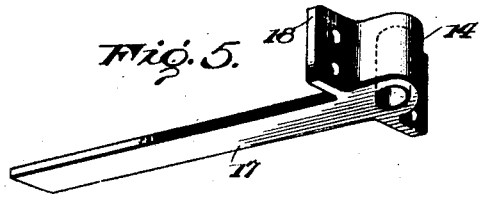
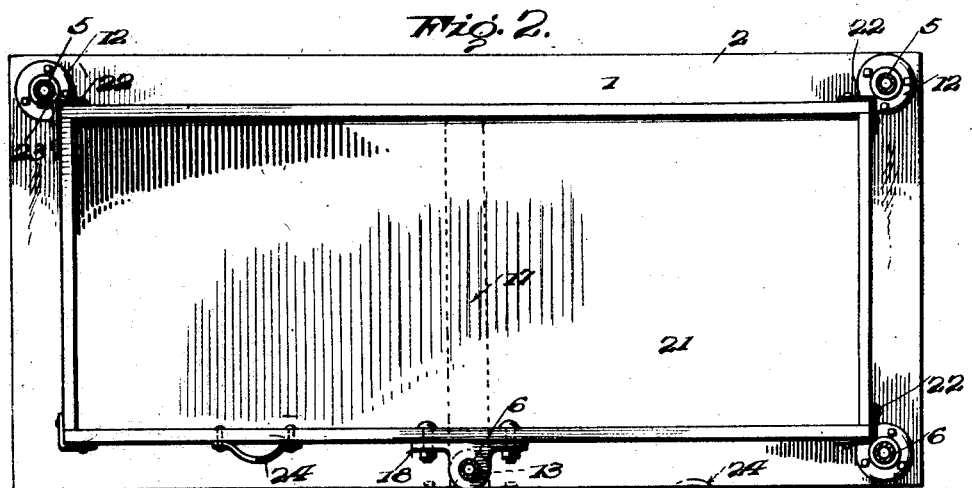
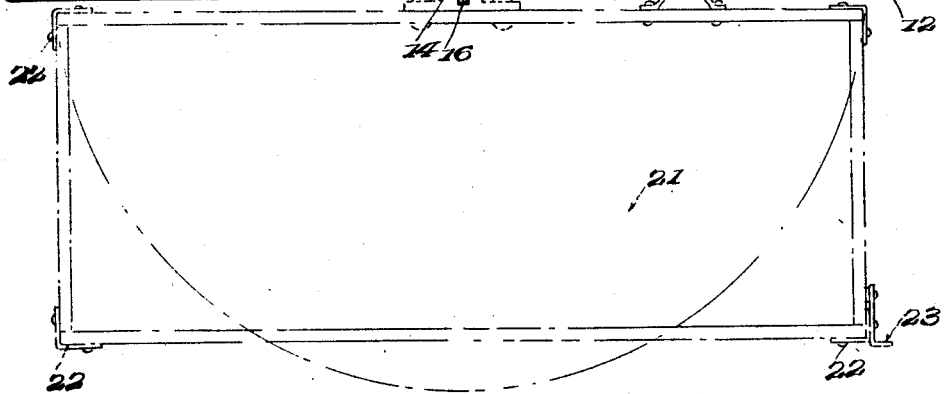
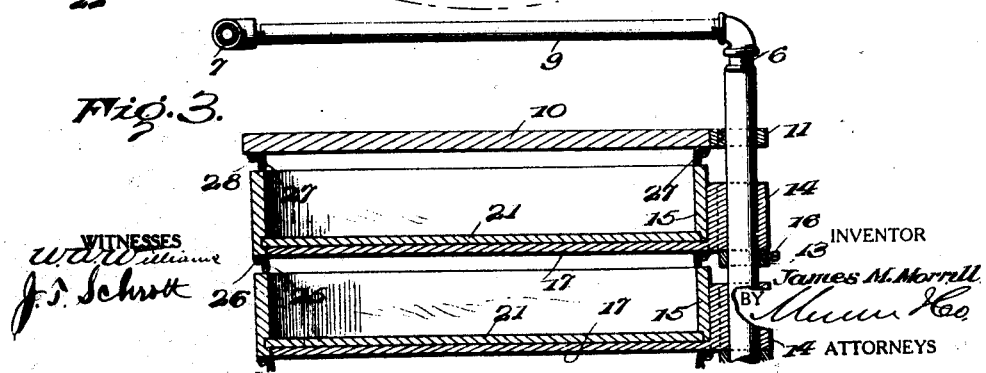

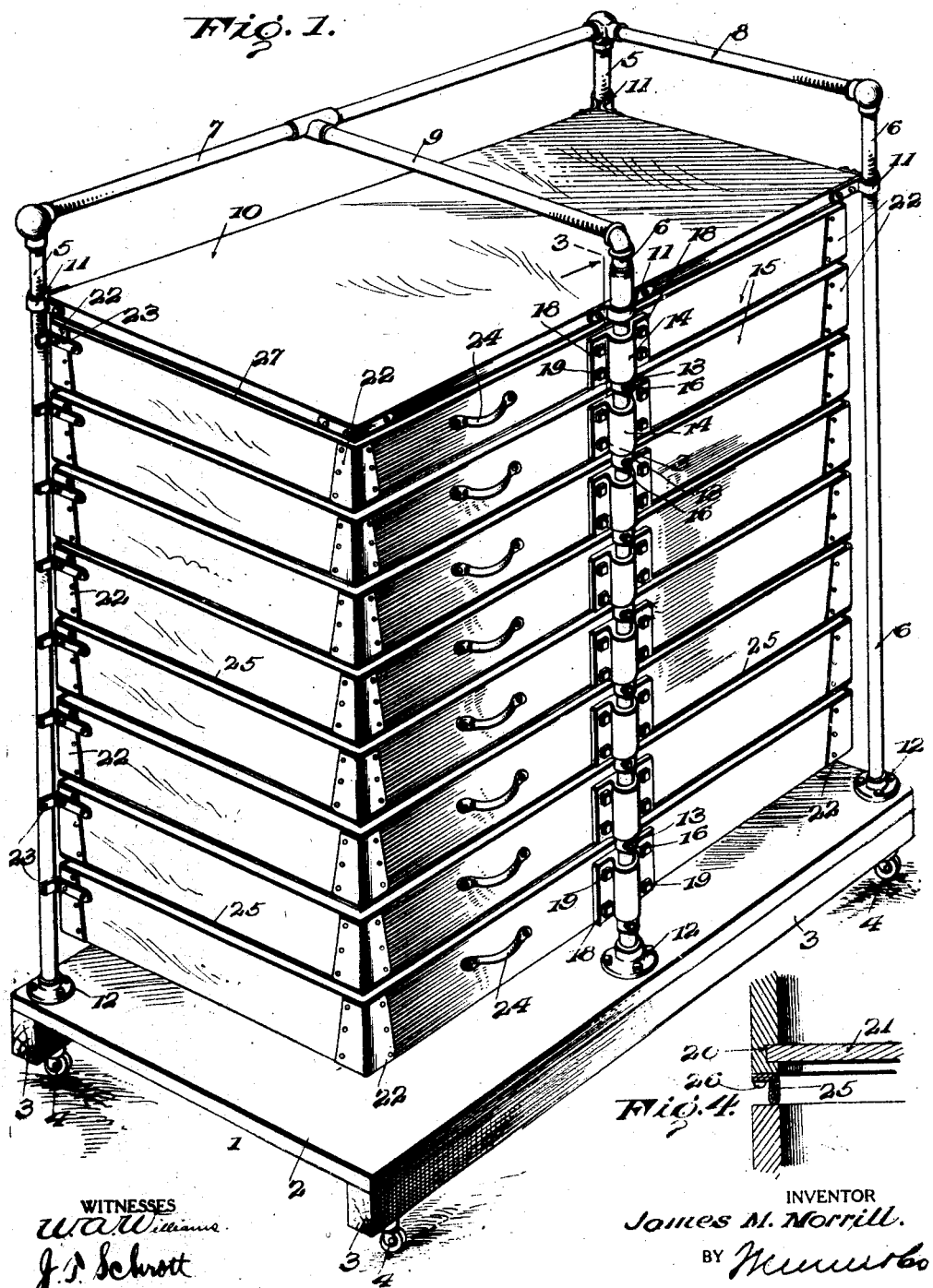

Patented July 10, 1928.

1,677,043

UNITED STATES PATENT OFFICE.

JAMES M. MORRILL, OF MILBANK, SOUTH DAKOTA.

BREAD PROOFER.

Application filed June 22, 1926. Serial No. 117,797.

This invention is a bread proofer, the purpose of which is to hold or rest the dough prior to molding into loaves, and it consists of the constructions, combinations and arrangements herein described and claimed.

An object of the invention is to so simplify the construction that the bread proofer may be had at a price within the reach of even the smallest bakers, one of the novel features contributing toward the foregoing object being the arrangement of the drawers in such a manner that they of themselves constitute the cabinet when closed.

Other objects and advantages appear in the following specification, reference being had to the accompanying drawings, in which Figure 1 is a perspective view of the improved bread proof box or proofer, Figure 2 is a horizontal section, one of the drawers being shown swung open in the dotted line position, Figure 3 is a detail cross section taken substantially on the line 3—3 of Figure 1, Figure 4 is a detail sectional view illustrating the closure construction between drawers, Figure 5 is a detail perspective view of one of the drawer brackets.

This proof box or proofer, as it is known in the vernacular of the art, has been designed to hold four hundred one-pound loaves of bread, this being large enough for the average small bakery for the use of which the invention is intended in particular. But regardless of the foregoing statement, it is quite obvious that the proofer can be made either larger or smaller to accommodate a greater or lesser number of loaves of bread.

One of the outstanding purposes of the invention is to employ such construction that the proofer may be cheaply manufactured, yet be of strong construction so that it will not fail after continued use. Bread for the best results should be rounded before molding and must rest between the two operations. The proofer is used to hold the dough prior to the molding operation, and the arrangement is such that the dough is protected from dust, dirt and flies, and by virtue of the fact that it is rather closely confined is also unlikely to crust.

It saves the baker's steps and avoids the necessity of long reaching. There is no lifting or shifting of proof boxes as according to present custom. With these introductory statements the invention can be understood to good advantage.

Reference is had to Figure 1. The base 1 is composed of a platform 2 with sills 3 on the underside both raising the base from the floor and providing an adequate support for the casters 4. It is not essential to use longitudinal sills as illustrated, although the platform must be adequately stiffened to support the load imposed upon it, and the sills are therefore regarded as quite effective for the purpose.

A framework mounted upon the base is composed of pairs of uprights 5 and 6. The first of these is located at what, for the purpose of distinction, may be regarded as the rear edge of the base, being spaced apart a distance substantially equal to the length of the base. The second of these is located at the front edge, being spaced apart a distance equal to substantially one-half the length of the base. Rails 7 and 8 connect the pair of uprights 5 with each other and with the outermost one of the uprights 6. A rail 9 connects the rail 7 with the remaining central upright 6.

Suitable pipe fittings are used to connect the various rails as shown, the rails and uprights, according to the illustration and proposed use, being composed of sections of piping sufficiently heavy for the purpose. This is not to be construed as a limitation of the invention, because the framework may be made otherwise. It is to be noted that the foregoing arrangement of the uprights and rails leaves one corner, if it might be so termed, vacant or open, this being necessary to permit swinging the drawers to the open position as presently appears.

A top 10 not only provides a closure but also assists in bracing the framework. For the latter purpose the top is connected with the various uprights by clips 11 which are securely bolted or otherwise affixed to the edges of the top. The lower ends of the uprights are screwed or otherwise secured in sockets 12 secured upon the base.

The central one of the foremost pair of uprights 6 carries a plurality of collars 13 upon which the hinge bracket 14 of the drawers 15 rest. The collars are clamped in position as at 16 (Fig. 3), the clamping means being subject to loosening so that the collars may be moved up or down upon the central support and the spacing between drawers thereby adjusted. The central support passes through the hinge brackets 14, and the former therefore becomes the pivot upon which any one of the drawers may be swung from the closed position in Figure 1 to the open and dotted line position in Figure 2.

Each bracket comprises the upright hinge portion 14, a relatively long bar 17 extending therefrom at right angles and a pair of lateral leaves 18. Bolts 19 pass through holes in the leaves to secure the hinge brackets upon the front ends of the various drawers. The front and rear ends and the sides of the drawers are rabbeted as for example at 20 in Figures 3 and 4 to receive the edges of the drawer bottom 21. The corners of the drawers are strengthened by metallic braces 22. One corner of each drawer is provided with a bracket 23 which serves as a bumper for engaging the nearest upright 5 (Fig. 1) to limit the swinging motion in one direction. The bumpers insure stopping all of the drawers in the same position so that the proofer presents a neat and uniform appearance.

Handles 24 provide convenient means for swinging the drawers upon a central support 6 to the open position (Fig. 2). These are mounted upon the front ends of the drawers at one side of the central support. Canvas or other pads 25 (Fig. 4) are secured to the under edges of the drawers by moldings 26. The arrangement is such that the pads extend downwardly to engage the upper and adjacent edges of the drawer next beneath. They provide closures for the spaces between drawers, serving to exclude dust, dirt, flies, etc. A pad 27 (Figs. 1 and 3) similar to the others, is secured beneath the top 10 by similar molding 28, the purpose being to provide a closure for the top drawer.

The operation will be readily understood. It is seen in Figure 1 that the arrangement of drawers is such that they of themselves form the cabinet or box. The drawers consist of trays in which the dough is placed prior to molding it into loaf formation. Any one of the drawers is swung to the open position (Fig. 2) by simply grasping the handle 24, it being seen in Figure 2 that when open the drawer is fully and entirely open, no part being either concealed or inaccessible. On the same principle, when closed the drawer is entirely closed, no part of the interior being exposed.

The drawers 15 are assembled upon the central support 6 in superimposed arrangement. The collars 13 provide the rests which fix the positions of the drawers, and it is upon the central support and the collars that the hinge brackets 14 of the drawers swing in the manner previously described. The bumper brackets 23 limit the closing movement of the drawers so that they all stop in line and present a neat, cabinet-like appearance.

The arrangement of canvas pads 25 and 27 around the edges of the drawers makes it possible to enclose the contents quite completely. These pads are sufficiently flexible to give as the drawers are opened and closed, and will make contact with the edges of adjacent drawers (Fig. 4) to close the space therebetween. When the proofer is not in use it can be pushed back out of the way as it is mounted upon rollers or casters 4. The proofer is a necessary article in a bakery, and by simplifying the construction as herein proposed can be manufactured to sell at a price within reach of anyone in the business.

While the contruction and arrangement of the improved bread proofer as herein described and claimed is that of a generally preferred form, obviously modifications and changes may be made without departing from the spirit of the invention or the scope of the claims.

I claim:—

1. A device of the character described comprisng a base, a framework mounted upon the base comprising a pair of uprights at one edge spaced substantially the full length of the base and a second pair of uprights at the opposite edge spaced approximately half length of the base, said arrangement leaving one corner of the base vacant, a plurality of trays each extending substantially the full length of the base and located within the framework in superimposed position, and means hingedly mounting the trays upon one of the latter pair of uprights permitting swinging the trays through said corner vacancy into open positions.

2. A device of the character described comprising a base, a skeleton framework carried by the base consisting of upright standards mounted upon the base being spaced to leave one of the corners of the base vacant for passage, one of said standards being positioned approximately centrally of and on one edge of said base, a top secured to the framework in parallel relationship to the base, a plurality of trays each extending substantially the full length of the base and situated within the framework between the base and top in superimposed position, hinge means attached to the respective trays, said hinge means being mounted upon said centrally positioned standard adjacent to said corner vacancy permitting passage of the trays through said corner vacancy to open position, means carried by the respective trays being engageable with another of the uprights to limit the closing movement when swung in the opposite direction, and means arranged around the top and around one edge of each of the trays respectively engageable with the adjacent edge of the uppermost tray and with the adjacent edges of the remaining trays to provide a closure between trays when in the closed position.

3. A device of the character described comprising a framework including a plurality of uprights, a plurality of trays situated within and extending substantially the full length of the framework, means by which the trays are hingedly supported upon one of the uprights, means clamped upon said uprights upon which the hinge means rests thereby supporting the trays in spaced, superimposed relationship, and flexible means mounted along one edge of each of the trays being engageable with the edge of the adjacent tray to provide a closure for the space between trays.

JAMES M. MORRILL.